United States Patent [19]

Garnweidner et al.

[11] Patent Number: 5,039,160
[45] Date of Patent: Aug. 13, 1991

[54] SIDE-COLLISION PROTECTIVE BEAM FOR MOTOR VEHICLE

[75] Inventors: Peter Garnweidner, Lamprechtshausen; Peter Üblacker, Bürmoos, both of Austria

[73] Assignee: Austria Metall Aktiengesellschaft, Braunau am Inn, Austria

[21] Appl. No.: 547,757

[22] Filed: Jul. 2, 1990

[30] Foreign Application Priority Data

Jul. 5, 1989 [AT] Austria .................................. 1634/89

[51] Int. Cl.⁵ ............................................. B60R 27/00
[52] U.S. Cl. ..................................... 276/189; 296/140; 49/502
[58] Field of Search ............... 296/188, 146, 189, 29; 49/502

[56] References Cited

U.S. PATENT DOCUMENTS

| | | | |
|---|---|---|---|
| 3,829,149 | 8/1974 | Stevens | 296/188 |
| 4,090,734 | 5/1978 | Inami et al. | 296/146 |
| 4,708,390 | 11/1987 | Palentyn et al. | 296/188 |
| 4,861,097 | 8/1989 | Wycech | 296/188 |
| 4,866,883 | 9/1989 | Brown et al. | 49/502 |
| 4,919,473 | 4/1990 | Larmeghofer et al. | 296/188 |

FOREIGN PATENT DOCUMENTS 267895  5/1988  European Pat. Off. ............ 296/188
2207039  6/1974  France .

Primary Examiner—Robert R. Song
Attorney, Agent, or Firm—Herbert Dubno; Andrew Wilford

[57] ABSTRACT

A side-collision protective beam for a motor vehicle comprises an elongated outer flange extending along a longitudinal axis and having a pair of opposite ends, an elongated inner flange spaced from and extending parallel to the outer flange and having a pair of opposite ends, and a web transversely interconnecting the flanges. The flanges have at least one of the respective ends respective end portions extending longitudinally past the web and the end portion of the outer flange is bent transversely to the axis toward and lies flat against the end portion of the inner flange. A fastener transverses both end portions and is secured in the motor vehicle.

8 Claims, 4 Drawing Sheets

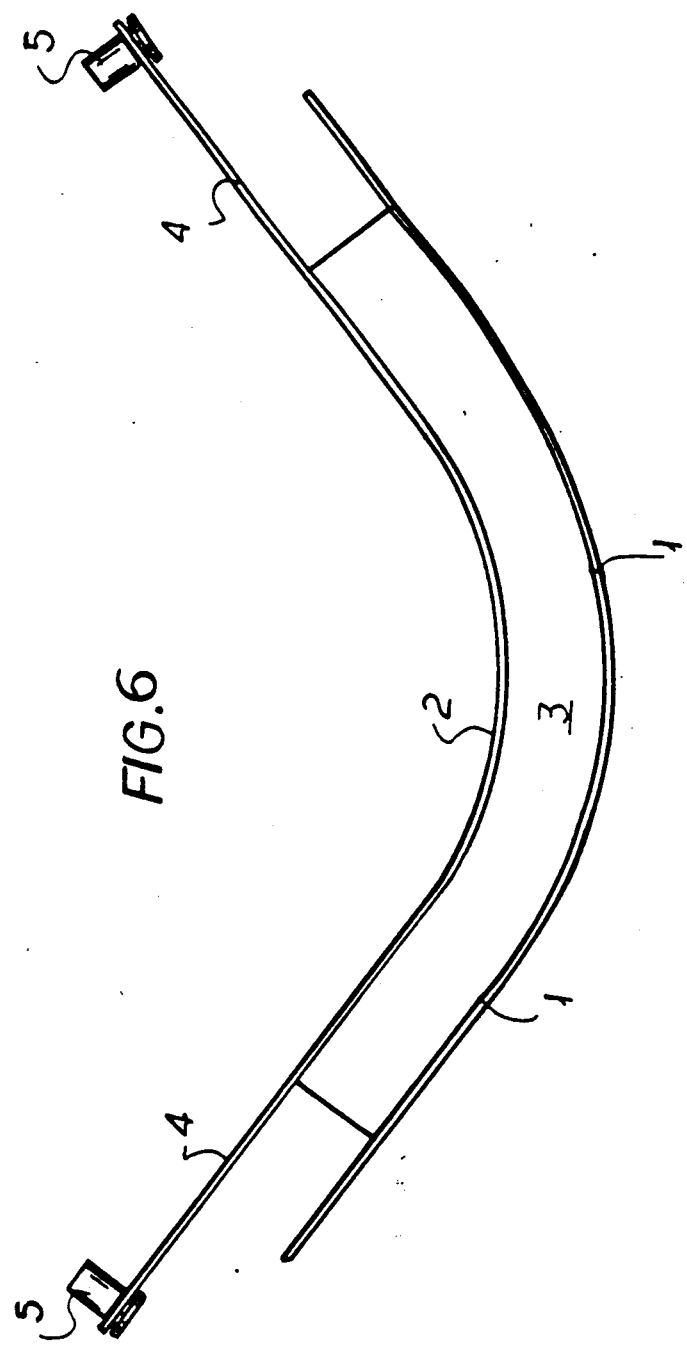

SIDE-COLLISION PROTECTIVE BEAM FOR MOTOR VEHICLE

FIELD OF THE INVENTION

The present invention relates to a collision-protecting beam for a motor vehicle. More particularly this invention concerns such a beam installed in a door or side panel of a motor vehicle and intended to protect the vehicle occupants against a side collision.

BACKGROUND OF THE INVENTION

It is known to provide side panels and doors of a motor vehicle with special beams to protect the vehicle occupants in the event of a side, that is neither head-on nor rear-end, impact from outside. Such a beam increases the lateral strength or resistance to inward deformation of the normally provided body panels and is usually provided roughly at bumper height.

In accordance with present-day standards such a beam should offer a relatively constant resistance to deformation over a relatively long distance of such deformation. Thus the maximum amount of energy in a collision is absorbed. As a result such a beam is deformed considerably it being understood that such deformation is preferable to a situation where the oncoming colliding vehicle can traverse the door or side panel. Thus this beam is typically broken at the point of impact, since it is in this region where it is subject to maximum deformation and its plastic limit is exceeded. Hence jagged ends of the beam can come free and enter the passenger compartment, posing a considerable hazard for the occupants.

OBJECTS OF THE INVENTION

It is therefore an object of the present invention to provide an improved side-collision reinforcement beam for a motor vehicle.

Another object is the provision of such an improved side-collision reinforcement beam for a motor vehicle which overcomes the above-given disadvantages, that is which is capable of considerable deformation without breaking free at its end anchor points.

SUMMARY OF THE INVENTION

A side-collision protective beam for a motor vehicle comprises an elongated outer flange extending along a longitudinal axis and having a pair of opposite ends, an elongated inner flange spaced from and extending parallel to the outer flange and having a pair of opposite ends, and a web transversely interconnecting the flanges. The flanges have at one of the respective ends respective end portions extending longitudinally past the web and the end portion of the outer flange is bent transversely to the axis toward and lies flat against the end portion of the inner flange. A fastener traverses both end portions and is secured in the motor vehicle.

As a result of this construction additional deformation can take place in the region of the connection to the motor-vehicle frame. There is thus little stretch at the location of the impact. The various lengths and shapes of the two flanges cause different stretching and deformation of these two flanges so that one of the flanges ruptures and the other continues to deform. As a result there is less deformation at the point of impact and the unbroken flange remains connected to the frame. Furthermore the broken flange remains connected to the unbroken flange, so that danger to the vehicle's occupants is minimized.

According to another feature of this invention both end portions have extreme outer ends bent outward transverse to the axis. Thus there is some possibility of shifting of the beam inward.

The end portion of the inner flange according to this invention extends generally parallel to the axis. Furthermore the end portion of the outer flange is corrugated. Thus as the beam is crushed inward, the inner flange will rupture at the ends then the outer flange will deform inward with straightening of the bent end portions. Considerable energy will be absorbed as the bent outer end portions of the outer panel are pulled parallel to the beam axis.

In accordance with a further feature of this invention the fastener is a threaded sleeve. The end portion of the outer flange is formed adjacent the fastener with weakened regions, which can be constituted as specially formed grooves or cuts, or simply by the hole for the fastener.

Furthermore according to the invention the outer portion of the inner flange is formed with a hole through which the fastener is loosely engageable.

DESCRIPTION OF THE DRAWINGS

The above and other objects, features, and advantages will become more readily apparent from the following, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing:

FIGS. 5 and 6 are views like FIG. 4 showing the beam of FIG. 4 in successive states of deformation.

SPECIFIC DESCRIPTION

Figure 1:
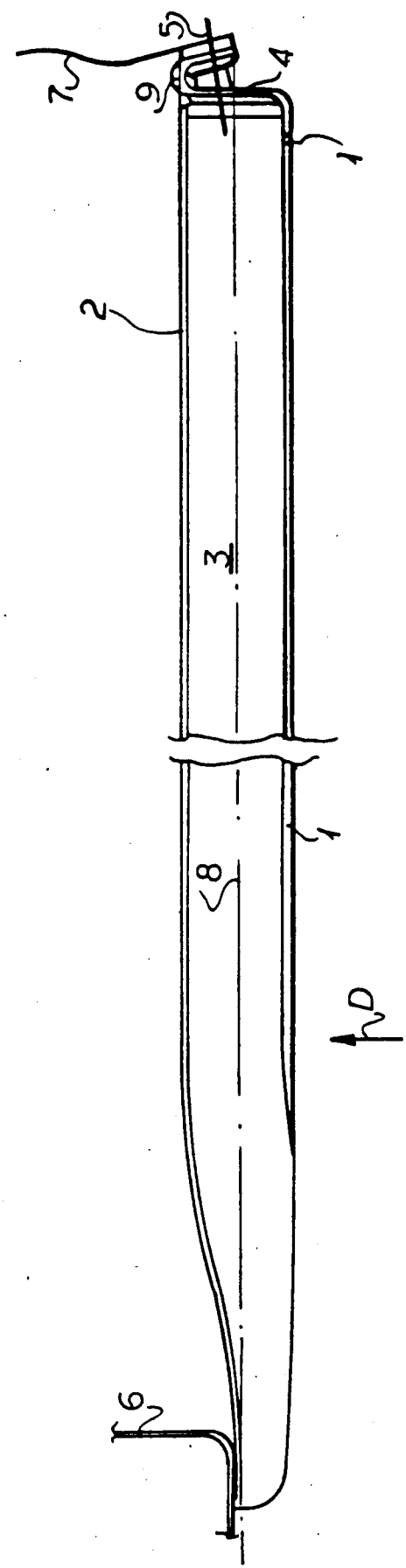
FIG. 1 is a top view of a beam according to this invention.

As seen in FIG. 1 a side-collision protective beam according to this invention has vertical outer and inner side flanges 1 and 2 separated by a horizontal web 3, which need not be perfectly central to impart an I- or H-section to the beam. One end of the beam 1, 2, 3 is secured at a fastening 5 to a part 7 of the vehicle and the opposite end to another part 6 thereof.

Figure 2:
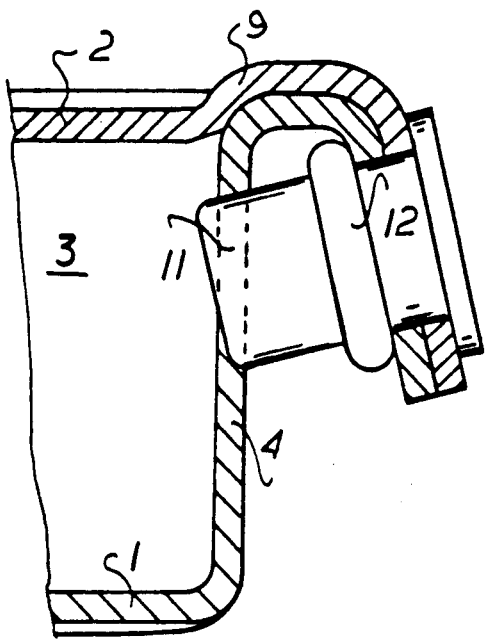
FIGS. 2 and 3 are large-scale detail views of the end of the beam in undeformed and deformed condition, respectively.

As seen in FIG. 2 the web 3 of the beam is cut away adjacent one of its ends. In addition the outer flange 1 of the beam has at this end an end portion 4 that is bent inward here at 15 about a right angle to a horizontal longitudinal center axis 8 of the beam, then outward parallel to the axis 8, then back outward at an angle. The inner flange 2 has an end portion 9 that lies flat against this inner portion, with a threaded sleeve or rivet 10 passing through the two portions 4 and 9. This rivet 10 has a bead 12 that lies inside the end portion 4 and projects through a hole 11 formed in the end portion 4.

Figure 3:
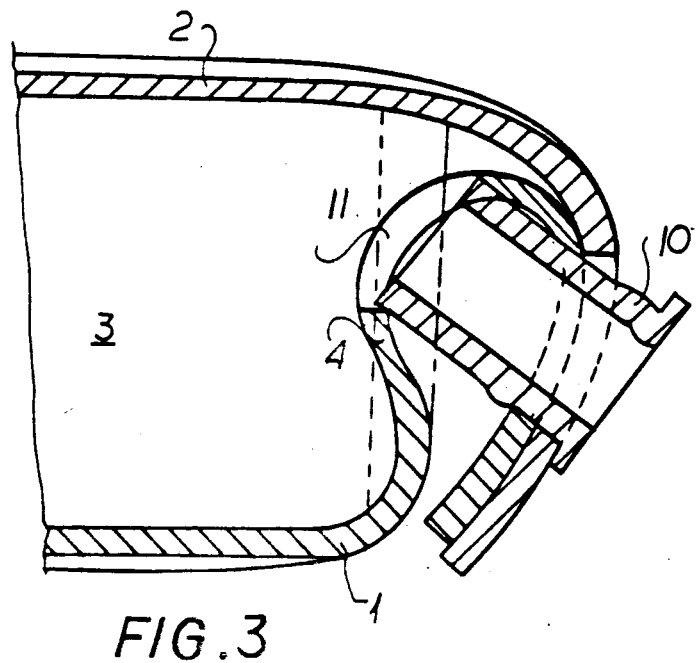

On inward deformation of the beam in direction D (FIG. 1) as shown in FIG. 3 the rivet 10, which is also secured to the body part 7, bends around and forces the rivet 10 tightly into the hole 11, thereby clamping the assembly tightly together. Thereafter on further deformation the inner panel or flange 2 will likely rupture at the weakening formed by the hole where the rivet 10 traverses it, and the portion 4 of the outer panel or flange 1 will straighten out.

Figure 4:
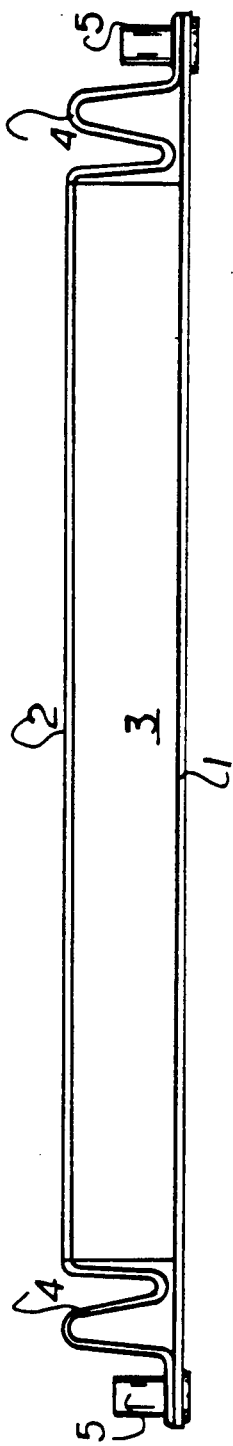
FIG. 4 is a view like FIG. 1 of another beam in accordance with this invention.
Figure 5:
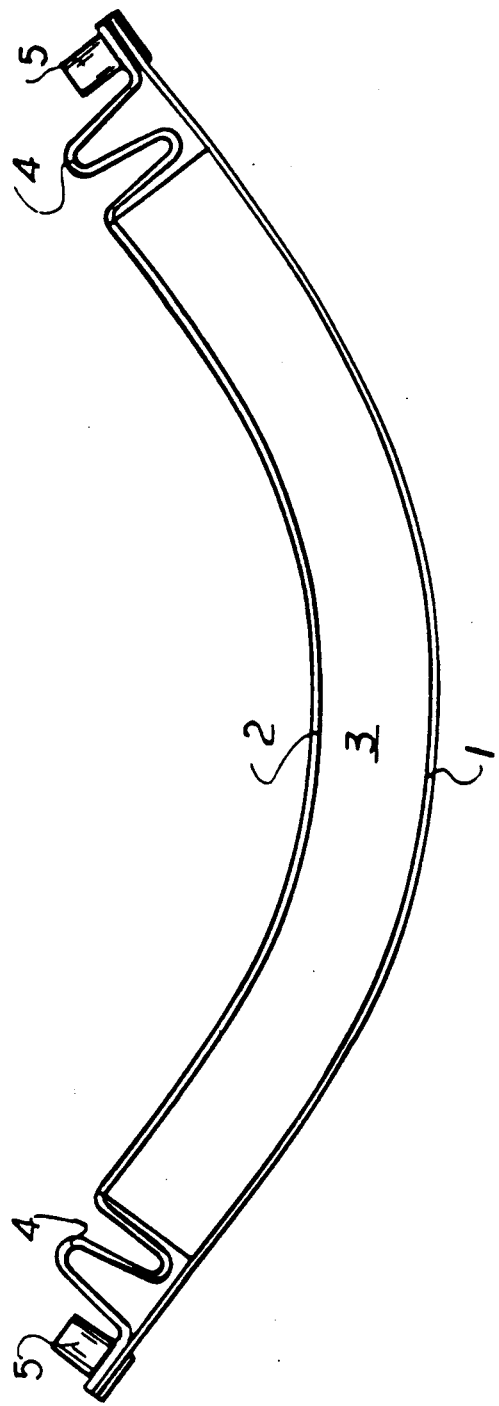

In FIG. 4 a similar arrangement is shown, but with a double-corrugated or U-shaped end portion 4. Here the outer end of this portion 4 is extended to the plane of the inner panel 1 where it is secured by another sleeve rivet 5. Thus as shown in FIGS. 5 and 6 as the beam 1 is bent inward at first it will simply deform. Once the ends of the inner panel 1 break loose at the attachments 5, although it is possible to provide weakening holes or grooves in this region, further deformation takes place as straightening of the end portions 4. Thus the inner panel 1 remains connected to the assembly.

We claim:

1. A side-collision protective beam for a motor vehicle, the beam comprising:
   an elongated outer flange extending along a longitudinal axis and having a pair of opposite ends;
   an elongated inner flange spaced from and extending parallel to the outer flange and having a pair of opposite ends;
   a web transversely interconnecting the flanges, the flanges having at one of the respective ends respective end portions extending longitudinally past the web, the end portion of the outer flange being bent transversely to the axis toward and lying flatly against the end portion of the inner flange; and
   a fastener traversing both end portions and secured in the motor vehicle.

2. The side-collision protective beam defined in claim 1 wherein both end portions have extreme outer ends bent outward transverse to the axis.

3. The side-collision protective beam defined in claim 1 wherein the end portion of the inner flange extends generally parallel to the axis.

4. The side-collision protective beam defined in claim 1 wherein the end portion of the outer flange is corrugated.

5. The side-collision protective beam defined in claim 1 wherein the fastener is a threaded sleeve.

6. The side-collision protective beam defined in claim 1 wherein the end portion of the outer flange is formed adjacent the fastener with weakened regions.

7. The side-collision protective beam defined in claim 1 wherein the outer portion of the inner flange is formed with a hole through which the fastener is loosely engageable.

8. The side-collision protective beam defined in claim 1 wherein both ends of both flanges have outer portions extending longitudinally past the web and both end portions of the outer flange are bent transversely to the axis toward and lie flat against the respective end portion of the inner flange.

* * * * *